3,404,979
ELECTROPHOTOGRAPHIC LAYERS WITH POLYAMIDE BINDERS AND A PROCESS FOR THEIR MANUFACTURE
Georges Bonjour, Bron, France, assignor to Societe Lumiere, Paris, France, a French company
No Drawing. Filed Nov. 4, 1964, Ser. No. 408,743
Claims priority, application Switzerland, Nov. 13, 1963, 13,938/63
7 Claims. (Cl. 96—1.8)

ABSTRACT OF THE DISCLOSURE

The present invention provides a process for the manufacture of an electrophotographic layer, which comprises applying to a substrate an aqueous composition comprising a salt of a resin-forming polymer containing acid groups imparting solubility in water and a volatile nitrogen-containing base, a photoconductor and a non-volatile amine containing at least two reactive amino groups, and heating the substrate having the composition applied thereto to remove the volatile base and to form a polyamide by reaction of the non-volatile amine with the polymer.

---

The present invention relates to electrophotographic materials. Electrophotographic layers are commonly manufactured by dispersing inorganic or organic photoconductors in a resin which forms a binder layer that does not conduct electricity. One such photoconductor is zinc oxide. When such a layer is applied to a substrate, it may be given a negative charge in the dark, for example by a corona discharge. When the said layer is exposed under a master, the exposed zones are discharged. The unexposed zones may then be rendered visible by being sprinkled with an insulating powder capable of accepting a positive charge, since the powder granules are attracted in the areas carrying a negative charge. An image is then formed that can be made permanent in a variety of ways, for example by melting the powder or spraying with a lacquer.

According to the most widely used method electrophotographic layers are manufactured with the use of a resin dissolved in an organic solvent. The photoconductor is dispersed in this binding agent, a substrate, for example paper or film, is coated with the mixture, and the solvent evaporated. In this manner an insulating layer is formed which is not sensitive to moisture. Insensitivity to moisture is necessary to keep the electrical properties of the layer unimpaired irrespective of the moisture content of the surroundings. To remove and recover the organic solvents special devices are required which renders this method cumbersome and costly.

It has also been proposed to work in the absence of an organic solvent, using binding agents containing acid groups together with volatile bases which, after coating the substrate, are removed by heating. While this leads to a water-insoluble layer, the latter is still very sensitive to moisture. If the reaction of the binding agent containing acid groups with the volatile bases is carried further by the application of greater heat, water is eliminated and an anhydride is formed. At first the layer is insensitive to moisture, as intended. The elimination of water is, however, an at least partially reversible reaction, and after a certain time the layer again absorbs water from the air so that it loses its favorable properties.

The present invention provides a process for the manufacture of an electrophotographic layer, which comprises applying to a substrate an aqueous composition comprising a salt of a resin-forming polymer containing acid groups imparting solubility in water and a volatile nitrogen-containing base, a photoconductor and a non-volatile amine containing at least two reactive amino groups, and heating the substrate having the composition applied thereto to remove the volatile base and to form a polyamide by reaction of the non-volatile amine with the polymer.

The present process may be performed with the conventional carriers or substrates, for example films from cellulose acetate or especially paper.

The resins required for performing the present process contain acid groups imparting solubility in water, preferably carboxylic acid groups. As is obvious from the foregoing, the polymers must be of such degree of polymerization, and contain a sufficient number of groups imparting solubility in water, as to be soluble in water, at least in the form of salts of volatile nitrogen bases. For example, there are suitable copolymers of ethylenically unsaturated compounds free from solubilizing groups such for example as acrylic acid esters or especially vinyl esters of lower carboxylic acids with ethylenically unsaturated carboxylic acids, for example crotonic acid or at least dibasic acids such for example as maleic acid. Particularly good results are obtained with copolymers from vinyl acetate and maleic acid. There may be specially mentioned those copolymers which have a molecular weight of about 40,000 and in which the molecular ratio of maleic acid: vinylacetate is greater than 1:4. Products of this kind swell readily in water and dissolve well in water while forming salts with the volatile bases.

A preferred volatile nitrogen base is a base containing a single nitrogen atom, above all ammonia. Further suitable are lower monoamines such as methylamine or ethylamine. If it is desired to prevent completely the formation of carboxylic acid amide groups from the volatile bases on the subsequent heating with the non-volatile amines, tertiary volatile amines, such as trimethylamine, may be used.

Particularly suitable photoconductors for use in the present process are inorganic products such for example as the oxides of antimony, aluminum, bismuth, cadmium, mercury, molybdenum and lead. Preferred use is made of zinc oxide. When high-grade layers are to be manufactured, the zinc oxide to be used should be as pure as possible and advantageously is a product prepared by the so-called French method, that is to say by atmospheric oxidation of zinc vapor. In any case the photoconductor should be finely divided and preferably have a particle size below 1μ.

Another ingredient required in the performance of the present process is a non-volatile amine containing at least two reactive amino groups. Reactive amino groups are those which are capable of forming carboxylic acid amide groups with carboxylic acid groups, that is to say primary or secondary amino groups. Preferred use is made of aliphatic polyamines, for example those of the formula

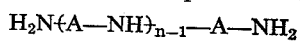

where A represents an alkylene radical such for example as the —CH$_2$—CH$_2$—CH$_2$ or especially the

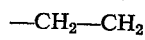

radical, and $n$ is a whole number. As examples there may be mentioned diethylene-triamine, triethylenetetramine, tetraethylenepentamine and hexamethylenediamine.

If desired, further additives may be used in the manufacture of the layers. Inter alia, the following elements or their compounds may be added in an amount ranging from 0.1% to 5% referred to the weight of the photoconductor: Boron, thalium, lithium, lead, cobalt and silver. These substances can be admixed with the zinc oxide in the known manner by migration at 400° C. to 600° C. or they may be added to the mixture in the form of salt solution. Such additions have favorable effects in that they enhance the light sensitivity of the photoconductor layer, increase the rate of charge, improve the distribution of the charge and thus also the sharpness of the picture and/or the contrast of images.

The proportions in which the materials are to be used in the present process may vary within relatively wide limits. For example, 2% to 20% of copolymer may be used referred to the weight of the photoconductor. The amount of water is advantageously chosen so that, on the one hand, the substances to be dissolved in water pass readily and completely into solution and, on the other hand, the resulting mixture has an appropriate consistency for coating the base. It may be, for example, 1 to 10 times the weight of copolymer. The amount of volatile amine to be added should generally be sufficient to cause substantially complete dissolution of the copolymer. In general it is advantageous to add so much of the volatile base that for every acid equivalent there are 1 to 2 base equivalents available. For the non-volatile polyamine the molecular ratio of (acid equivalent of copolymer):(base equivalent of polyamine) is preferably within the range of 1:0.8 to 1:1.

In other respects the present process may be performed in the conventional manner: Preferably, the polymer containing acid groups imparting solubility in water is dissolved in water in the presence of the volatile nitrogen base, the photoconductor is finely distributed in the solution, the nonvolatile amine containing at least two reactive amino groups is added, the resulting aqueous preparation is applied to the base and the whole is heated until the volatile base has escaped and a stable, non-volatile polyamide has formed.

By varying the proportions of photoconductor to copolymer for example within the limits indicated above—it is possible to improve the contrast of images obtained on material manufactured by the present process; alternatively, this contrast can be enhanced or reduced by varying the exposure time.

In general it is advantageous to coat the substrate on both sides. In this manner the mechanical properties of the material can be substantially improved compared with those of material coated on one side only; more especially, the curling tendency of the material can be reduced. In addition, material coated on both sides is better for a given inferior total layer thickness, that is to say a faster electrophotographic material can be produced. However, whether the substrate is coated on one or two sides, the total layer thickness should preferably be at least 15$\mu$. On the other hand, the total layer thickness should in general not exceed 40$\mu$. The temperature at which the material is heated to form the insoluble polyamide is advantageously from 100° to 120° C. and the time for which this temperature should be maintained ranges from 1 to 30 minutes.

Electrophotographic material manufactured by the present process can be used for producing images in the known manner. As is generally done, the material is advantageously given a negative charge by corona discharges and exposed under a master or in an enlarger, whereupon the image is rendered visible and fixed, for example is indicated above.

Unless otherwise indicated, parts and percentages in the following examples, which illustrate the invention, are by weight.

Example 1

15 parts of a commercial copolymer from vinyl acetate and maleic acid (for example the product marketed under the trademark Nitromul by I.C.I.) are mixed with 2 parts by volume of 15 N-ammonia and dissolved in 150 parts of distilled water. 100 parts of zinc oxide (for example the product marketed under the name Oxyde de Zinc Neige by Société de la Vieille Montagne) are dispersed in the solution, and 10 parts by volume of a N-aqueous diethylenetriamine solution are added. A coat 20$\mu$ thick is produced with resulting dispersion on a paper that is little sensitive to water and weighs 75 g./m.$^2$. The coated paper is dried for 15 minutes at 120° C. The coating produced in this manner is not affected by water. On this material an image can be produced under a device for corona discharge of 10 kilovolts, imagewise exposure and development in the dark with a conventional electrostatic powder.

Example 2

15 parts of a ternary copolymer from vinyl acetate, vinyl caprate and maleic acid (for example Vinamul 6050, manufactured by Reichhold-Beckacite) are mixed with 2 parts by volume of 15 N-ammonia, dissolved in 150 parts of water and in the solution 100 parts of zinc oxide are dispersed. 15 parts by volume of N-aqueous hexamethylenediamine solution are then added. The dispersion is spread in a layer 20$\mu$ thick over paper weighing 65 g./m.$^2$ and the whole dried for 3 minutes at 120° C. The resulting layer is not affected by water and can be used for producing images on it as described in Example 1.

Example 3

A suspension of the following composition is prepared:

150 parts of water
15 parts by volume of 15 N-ammonia
10 parts of a commercial copolymer from vinyl acetate and maleic acid (for example the product marketed by Messrs. Rousselot under the trademark X 209 A)
0.5 part of a 20% aqueous solution of the ammonium salt of the copolymer from styrene and acrylic acid (ratio by weight 3:2) which acts as a dispersant.

When the copolymers have dissolved, there are added to the solution 90 parts of zinc oxide (for example the product marketed under the trademark "oxyde de zinc pur type A" by Compagnie de la Vieille Montagne)
0.5 part of Bengal pink (Schultz dyestuff tables, 7th edition, No. 889)
0.02 part of fluorescein (Schultz dyestuff tables, 7th edition, No. 880) and
15 parts of N-aqueous hexamethylenediamine solution making sure that all ingredients are well distributed. The mixture obtained in this manner is applied evenly to a paper weighing 56 g./m.$^2$ so that the coating contains 30 g./m.$^2$ of zinc oxide. After drying for 10 minutes at 120° C., a firmly adhering layer has formed which can be charged in the usual manner, and exposed in daylight and developed.

Example 4

The procedure of Example 3 is adopted, except that the addition of zinc oxide is followed by the addition of 0.5 part of boric acid. The resulting electrophotographic paper is much less affected by minor irregularities in the layer thickness so that the images produced on this material are of enhanced sharpness.

What is claimed is:

1. A process for the manufacture of an electrophotographic layer, which comprises applying to a substrate an aqueous composition comprising (a) a salt of a copolymer obtained from a lower fatty acid vinyl ester and an ethylenically unsaturated carboxylic acid and a volatile nitrogen-containing base, (b) a photoconductor and (c) a non-volatile amine containing at least two reactive amino groups, and heating the substrate having the composition applied thereto to remove the volatile base and to form a polyamide by reaction of the nonvolatile amine with the polymer.

2. A process for the manufacture of an electrophotographic layer, which comprises applying to a substrate an aqueous composition comprising (a) the ammonium salt of a copolymer obtained from a lower fatty acid vinyl ester and an ethylenically unsaturated carboxylic acid, (b) a photo-conductor, and (c) a non-volatile amine containing at least two reactive amino groups, and heating the substrate having the composition applied thereto to remove ammonia and to form a polyamide by reaction of the non-volatile amine with the polymer.

3. A process for the manufacture of an electrophotographic layer, which comprises applying to a substrate an aqueous composition comprising (a) the ammonium salt of a copolymer obtained from a lower fatty acid vinyl ester and an ethylenically unsaturated carboxylic acid, (b) zinc oxide as a photo-conductor, and (c) a non-volatile amine containing at least two reactive amino groups, and heating the substrate having the composition applied thereto to remove ammonia and to form a polyamide by reaction of the non-volatile amine with the polymer.

4. A process for the manufacture of an electrophotographic layer, which comprises applying to a substrate an aqueous composition comprising (a) the ammonium salt of a copolymer obtained from a lower fatty acid vinyl ester and an ethylenically unsaturated carboxylic acid, (b) zinc oxide as a photo-conductor, and (c) a nonvolatile amine of the formula

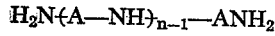

wherein A represents an alkylene radical containing from 2 to 6 carbon atoms and $n$ is an integer of at the most 3, and heating the substrate having the composition applied thereto to remove ammonia and to form a polyamide by reaction of the non-volatile amine with the polymer.

5. A process for the manufacture of an electrophotographic layer, which comprises applying to a substrate an aqueous composition comprising (a) the ammonium salt of a copolymer obtained from vinyl acetate and maleic acid, (b) zinc oxide as a photo-conductor, and (c) diethylenetriamine, and heating the substrate having the composition applied thereto to remove ammonia and to form a polyamide by reaction of the diethylenetriamine with the polymer.

6. A process for the manufacture of an electrophographic layer, which comprises applying to a substrate an aqueous composition comprising (a) the ammonium salt of a copolymer obtained from vinylacetate, vinyl caprate and maleic acid, (b) zinc oxide as a photoconductor, and (c) hexamethylenediamine, and heating the substrate having the composition applied thereto to remove the ammonia and to form a polyamide by reaction of the hexamethylenediamine with the polymer.

7. An electrophotographic layer obtained by applying to a substrate an aqueous composition comprising (a) a salt of a copolymer obtained from a lower fatty acid vinyl ester and an ethylenically unsaturated carboxylic acid and a volatile nitrogen-containing base, (b) a photo-conductor, and (c) a non-volatile amine containing at least two reactive amino groups, and heating the substrate having the composition applied thereto to remove the volatile base and to form a polyamide by reaction of the non-volatile amine with the polymer.

References Cited
UNITED STATES PATENTS 2,469,407    5/1949    Powers et al.    117—161
3,159,483    12/1964    Behmenburg et al.    96—1

FOREIGN PATENTS 856,320    12/1960    England.

NORMAN G. TORCHIN, *Primary Examiner.*

J. C. COOPER, *Assistant Examiner.*